L. T. FEASTER.
ADJUSTABLE FINGER PIECE EYEGLASS HOLDER.
APPLICATION FILED MAY 12, 1914.

1,105,641.

Patented Aug. 4, 1914.

UNITED STATES PATENT OFFICE.

LUTHER THOS. FEASTER, OF FAIRMONT, WEST VIRGINIA.

ADJUSTABLE FINGER-PIECE EYEGLASS-HOLDER.

1,105,641.      Specification of Letters Patent.      Patented Aug. 4, 1914.

Application filed May 12, 1914. Serial No. 838,030.

*To all whom it may concern:*

Be it known that I, LUTHER THOS. FEASTER, a citizen of the United States, and residing at Fairmont, in the county of Marion and State of West Virginia, have invented certain new and useful Improvements in Adjustable Finger-Piece Eyeglass-Holders, of which the following is a specification.

This invention relates to certain new and useful improvements in adjustable finger-piece eye-glass holders.

The primary object of this invention is the provision of a device especially designed for the use of optometrists and jewelers in assembling finger pieces and spring mountings upon eye-glasses.

A further object of the device is to provide an adjustable holder for different sizes of lenses and positioning a pair of lenses in perfect alinement connected by the nose-piece and holding the same in a suitable manner for the ready assembling of finger-piece and spring mountings thereon.

A still further object is to provide a support having pairs of pins relatively adjustable for the reception of lenses of different thickness and also provided with a plurality of pairs of adjustable studs formed in different sizes to correspond with different sized lenses.

With these general objects in view and others that will appear as the nature of the invention is better understood, the same consists in the novel construction and combination of parts hereinafter more fully described, illustrated in the accompanying drawings, and pointed out in the appended claims.

Figure 1:
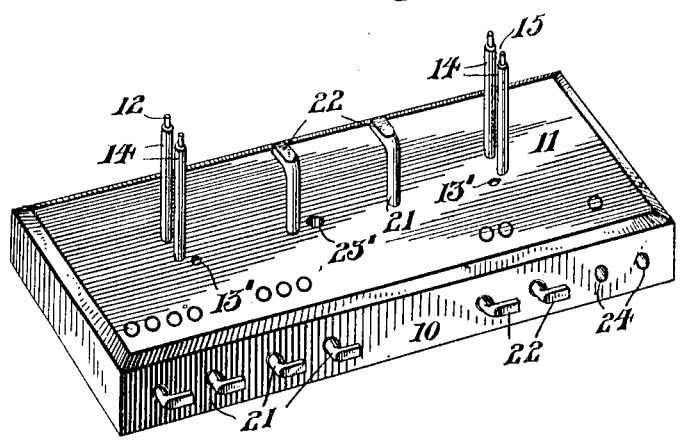
Figure 2:
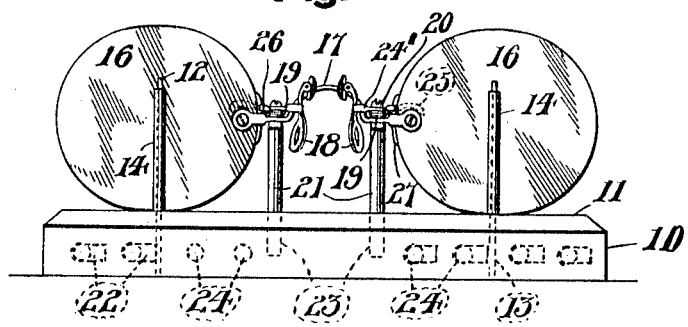
Figure 3:
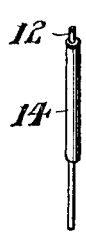
Figure 4:
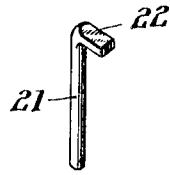

In the drawings forming a part of this application and wherein like numerals of reference designate corresponding parts throughout the several views:—Figure 1 is a perspective view of the device showing a pair of pins and studs positioned thereon and adapted for the holding reception of a pair of eye-glasses. Fig. 2 is a front elevation of the same showing the eye-glasses positioned thereon. Fig. 3 is a perspective view of one of the lens-engaging pins, and, Fig. 4 is a perspective view of one of the lens mount engaging studs.

Referring more in detail to the drawings, the base or block 10 is provided with its upper face 11 having two pairs of spaced-apart pins 12 extending therefrom and seated in sockets or perforations 13 in the block. The pins 12 are provided with a lens contacting surface consisting of a rubber sleeve or coating 14 and the spaces 15 between the pairs of pins being in alinement with each other and in a plane longitudinally of the base, the lenses 16 of any form of eye glasses being readily positioned within said openings 15 as best illustrated in Fig. 2.

The sockets 13 for each pair of pins 12 are positioned transversely of the base while a further recess 13′ is provided in the base at a point removed from and at one side of the rearmost socket 13 of each pair of said sockets. The sockets 13′ are adapted for the reception of the nearest ones of the posts 12, the said posts to be removed to the said sockets 13′ when desired to provide a greater distance between the pairs of pins for the accommodation of lenses of greater thickness. It being understood that the lenses 16 are connected together by a nose-piece mounting 17, it then becomes necessary to pivotally mount the nose-guards 18 and the finger-piece springs 19 upon the screw posts 20 and to assemble the said posts 20 upon the mounts. Angular studs 21 are provided having laterally-projecting flattened anvil heads 22 and adapted to be positioned upright upon the base 10 by means of intermediately-positioned sockets 23 in the upper face thereof. The rear side of the block is provided with four pairs of inwardly-extending sockets 24 respectively, designated upon the adjacent portion of the top of the block as 0, 00, 000, 0000, the said pairs of studs being serviceable respectively with lenses of different sizes from 0 size to 0000 size. The intermediate sockets 23 are positioned a distance apart equal to the usual spacing found between the spring mounting pins of eye-glasses and with the studs 21 positioned as illustrated in Fig. 1 and with the eye-glasses supported between the pins 14 as illustrated in Fig. 2, the anvil heads of the studs are adapted to receive thereon the nose piece mountings at the proper points for positioning the threaded screw-receiving openings, and thus forming a firm base for screwing the posts 20 in their assembled positions therein and with the finger-piece brackets 24′ with their tensioning springs 19 carried thereby.

It is to be understood that the finger piece mounts 24′ receive the posts 20 therethrough and thus position the nose-guards 18 at one side of the glasses while the finger-pieces 25 are positioned upon opposite sides of the lenses while the springs 19 encircle the posts 20 and have one of their ends secured to the mounts 24' and their other ends 26 fulcrumed against the side of the lens mount 27 in the usual manner.

When it is desired to position eye-glasses having shorter nose-pieces than can be accommodated by studs positioned in the sockets 23, one of the studs is removed to a less distance by inserting the same in a further socket 23' and in which position, the studs may then accommodate lenses which are positioned nearer together by the employment of shorter nose-pieces and mounts.

The complete operation of the device is believed to be apparent from the present detailed description thereof in that the rubber covered pins are positioned upon the base for the reception of lenses and the pair of studs 21 are employed which correspond with the size of the lenses and the lens mountings being positioned seated upon the stud heads, the finger-piece mountings are readily assembled while the lower projecting ends of the screw post 20 may be slightly headed over if desired, by forcing a contact between their lower ends and the stud heads. It is to be understood that the studs 21 for the different sizes of lenses are adapted to project above the upper face of the base when positioned within their receiving sockets therein a distance equal to one-half the transverse radius of the lenses of a corresponding size. By this device, it will be apparent that the lenses may be brought into perfect alinement upon the base and between the pins thereof and may be changed if required by a slight bending of the nose-piece while all of the elements of the finger-piece resiliently-mounted nose guards may be readily and easily assembled.

While the forms of the invention herein shown and described are what are believed to be preferable embodiments thereof, it is nevertheless to be understood that various forms and modifications may be resorted to which fall within the spirit and scope of the invention as claimed.

What I claim as new is:—

1. A device of the class described, comprising a base provided with pairs of spaced-apart openings transversely-positioned adjacent each end thereof and with a similar opening inwardly positioned and at one side of the rearward ones of each of said pairs of openings, the said base also provided with two intermediately-positioned sockets, rubber covered pins arranged in pairs within the said openings and providing lens-receiving spaces between the pins of each pair thereof, and flat headed studs mounted within said sockets and adapted for the seating of the mountings of said lenses thereon.

2. A device of the class described, comprising a base provided with a plurality of pairs of graded stud-receiving sockets and provided in its upper face with pin-receiving and stud-receiving sockets, pins, rubber sleeves upon said pins for a portion of their length, the said pins adapted for seating in pairs in said pin-receiving sockets, studs provided with flattened laterally-projecting anvil heads and a pair thereof adapted for seating within said stud-receiving sockets, the said pins being adapted for the edge-wise reception of eye-glass lenses therebetween and with the mountings of said lenses seated upon the heads of said studs.

3. A device of the class described, comprising a base, adjustable lens positioning pins removably mounted upon said base, and adjustable lens mount supporting studs mounted upon said base and intermediately positioned with respect to said pins.

In testimony whereof I affix my signature in presence of two witnesses.

LUTHER THOS. FEASTER.

Witnesses:
Z. F. DAVIS,
GEO. E. AMOS.

---

Copies of this patent may be obtained for five cents each, by addressing the "Commissioner of Patents, Washington, D. C."